United States Patent [19]

Maass et al.

[11] 4,426,509
[45] Jan. 17, 1984

[54] STORABLE CROSSLINKABLE ORGANOPOLYSILOXANE MOLDING COMPOSITIONS

[75] Inventors: Günther Maass, Berg.-Gladbach; Hans Sattlegger, Odenthal; Hans J. Lücking, Leverkusen, all of Fed. Rep. of Germany

[73] Assignee: Bayer Aktiengesellschaft, Leverkusen, Fed. Rep. of Germany

[21] Appl. No.: 411,750

[22] Filed: Aug. 26, 1982

[30] Foreign Application Priority Data

Sep. 5, 1981 [DE] Fed. Rep. of Germany ....... 3135185

[51] Int. Cl.³ .............................................. C08G 77/04
[52] U.S. Cl. ....................................... 528/34; 528/18; 528/21; 528/901
[58] Field of Search ...................... 528/34, 901, 21, 18

[56] References Cited

U.S. PATENT DOCUMENTS 3,819,563  6/1974  Takago et al. ...................... 528/901
4,180,642  12/1979  Takago ................................. 528/34

FOREIGN PATENT DOCUMENTS 2335569  1/1974  Fed. Rep. of Germany .

*Primary Examiner*—Melvyn I. Marquis
*Attorney, Agent, or Firm*—Sprung, Horn, Kramer & Woods

[57] ABSTRACT

In a plastic organosiloxane molding composition which in the absence of water is capable of being stored and in the presence of moisture is cross-linked to a rubber, the composition comprising a hydroxypolydiorganosiloxane, a nitrogen base and heavy metal compound as cross-linking catalyst, and a cross-linking agent, the improvement which comprises employing as the cross-linking agent a compound of the formula

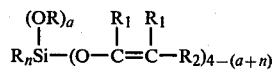

or a partial hydrolysis product thereof, wherein
R is an optionally substituted alkyl, alkenyl or aryl group,
$R_1$ is hydrogen or R,
$R_2$ is an acyl, carbalkoxy or carbaroxy group or $R_1$,
a is 1-3, and
n is 0, 1 or 2 and $a+n \leq 3$.

Upon curing no unpleasant odors are given off upon decomposition of the cross-linking agent.

3 Claims, No Drawings

STORABLE CROSSLINKABLE ORGANOPOLYSILOXANE MOLDING COMPOSITIONS

The present invention relates to plastically deformable mixtures of organopolysiloxanes, new crosslinking agents, catalysts and auxiliaries. The mixtures are capable of being stored in the absence of moisture, but harden to give a resilient silicone rubber when exposed to normal atmospheric moisture or water.

Mixtures of this type are predominantly used as joint-sealing compositions in the building sector, in sanitary installations and in industry. They contain an $\alpha,\omega$-dihydroxypolydiorganosiloxane, optionally mixed with a filler or other auxiliaries. If a silicon compound carrying at least three hydrolyzable groups is added to an oil of this type in the absence of moisture, mixtures are obtained which harden to give a resilient rubber when exposed to atmospheric air, owing to the water vapor content thereof.

Examples of known and customary silicon compounds having a crosslinking action are aminosilanes, oximatosilanes, acyloxysilanes and acrylamidosilanes. When used in closed rooms, the trifunctional acetoxysilanes and aminosilanes can release vapors having an annoying odor. A further disadvantage of individual systems of this type is that mixtures contaning these crosslinking agents are not sufficiently capable of being stored in certain circumstances. During the hydrolysis which initiates the crosslinking, carboxylic acid, which can be corrosive, is liberated from the alkyltriacyloxysilanes.

Trialkenoxysilanes are also suitable as crosslinking agents, but they cause the pastes prepared therewith to have a poor stability to storage. German Offenlegungsschrift 2,827,293 describes a paste mixture containing trialkenoxysilanes, in which additives of special silane compounds improve the stability to storage. These special silanes, for example

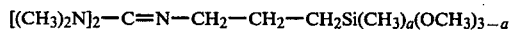

$[(CH_3)_2N]_2-C=N-CH_2-CH_2-CH_2Si(CH_3)_a(OCH_3)_{3-a}$ are very expensive substances since they have to be prepared via complicated synthesis routes.

Surprisingly, it has been found that room temperature-crosslinkable pastes which are stable to storage are obtained when silanes of the general formula

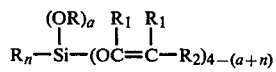

$$R_n-Si-(OC=C-R_2)_{4-(a+n)}$$
with $(OR)_a$ and $R_1$, $R_1$ substituents wherein R is an optionally substituted alkyl, alkenyl or aryl group, $R_1$ is hydrogen or R, $R_2$ is acyl, carbalkoxy or carbaroxy group or $R_1$.

a is an integer from 1 to 3, and n is 0, 1 or 2, and $a+n \leq 3$. are employed together with small added amounts of bases and heavy metal salts of long-chain carboxylic acids as crosslinking catalysts.

The present invention therefore relates to plastic organosiloxane molding compositions which are capable of being stored in the absence of water, are crosslinked when exposed to moisture, and are composed of a hydroxypolydiorganosiloxane, a substance having a crosslinking action, crosslinking catalysts and, if appropriate, adhesion promoters, fillers, pigments and other auxiliaries, characterised in that crosslinking agents of the type described above, or partial hydrolysis products thereof, are employed together with small added amounts of nitrogen bases and heavy metal compounds as crosslinking catalysts.

An advantage of the crosslinking substances according to the invention is that, in a paste prepared therewith, they give not corrosive by-products, but only neutral keto compounds mixed with alcohols, during hardening under the influence of moisture. Owing to this property, pastes of this type are very pleasant to handle both in the preparation and in use. As crosslinking catalysts heavy metals and bases are used. Bases are e.g. KOH, NaOH, LiOH or nitrogen bases. The silanes can be prepared according to methods which are in themselves known.

Examples of alkoxy groups are methoxy, ethoxy, propoxy or butoxy radicals. The crosslinking substances contain from 1 to 3 alk-1-enoxy groups which are derived from the enol form of keto compounds. When pastes prepared therewith are hardened under the influence of moisture, the alk-1-enoxy groups are split off hydrolytically and form the keto compound again. Thus, for example, acetone is formed from an isopropenoxy group and methyl ethyl ketone from isobutenoxy groups. The substitutents are not restricted to mono-keto compounds, but can also be derived from the particularly readily formed enol form of 1,3-diketones, such as, for example, acetylacetone. As a further variation of the alkenoxy radical, it is possible to employ the substituted enol form of a keto acid ester, such as, for example, ethyl acetoacetate. Aldehydes which can be converted to the enol form may also be employed as starting compounds. The linking of the silicone polymers can also be carried out with partial hydrolysis products of the crosslinking agents described.

The crosslinking agent is added in an amount of about 2 to 15% by weight, preferably 3 to 7% by weight, relative to the total paste in each case.

Primary, secondary and tertiary nitrogen bases are suitable as crosslinking catalysts. They can be mono-, di-, tri- or polyamines, and it is also possible for the nitrogen to be present in cyclic systems or imine groups. Very strong bases, such as, for example, 1,8-diaza-bicyclo-(5,4,0)undec-7-ene and 1,5-diazo-bicyclo(4,3,0)non-5-ene, have proved particularly suitable. The amount of these catalysts can vary between about 50 ppm and 1% by weight, relative to the total paste.

Heavy metal compounds of carboxylic acids, as known from the state of the art for room temperature-crosslinkable silicone rubbers, are furthermore employed together with bases as catalysts. These include, for example, dibutyl-tin dilaurate, dibutyl-tin diacetate and dibutyl-tin dioctanoate.

The base polymers of pastes of this type are $\alpha,\omega$-dihydroxypolydiorganosiloxanes having a viscosity of about 500 to 1,000,000 mPa.s, it being possible for the organic radicals to be alkyl, such as methyl, alkenyl, such as vinyl, or aryl, such as phenyl, groups, or mixtures thereof. The most important polymers of this class, by far, are the polydimethylsiloxanes. Methyl-terminated or slightly branched polydimethylsiloxanes can also be admixed with this base polymer which may also possess small proportions of terminal trimethylsiloxy groups.

According to the known state of the art, the mechanical properties of the resulting rubber are improved by the addition of reinforcing fillers, such as precipitated or pyrogenic silicic acid, to the paste. The addition of known adhesion promoters and other auxiliaries is also possible, as in the case of similar pastes.

In another embodiment of the present invention, it is also possible selectively to add one or more of the components to the paste mixture only shortly before use.

The silicone molding compositions described, which are stable to storage in the absence of water, are particularly advantageous in use, since the crosslinking agents employed do not produce any corrosive or annoying cleavage products. In addition, the crosslinking agents according to the invention can be produced economically. For these reasons, the compositions according to the invention are of considerable advantage compared with the state of the art.

The examples which follow are intended to illustrate the subject of the present invention in more detail.

EXAMPLE 1

90 parts by weight of α,ω-dihydroxypolydimethylsiloxane having a viscosity of 50,000 mPa.s are initially introduced. 6 parts by weight of a methyl-di-ethoxyisopropenoxy-silane and 0.2 part by weight of 1,5-diazobicyclo(4,3,0)non-5-ene are added at room temperature, and the mixture is stirred. 9 parts by weight of finely dispersed silicic acid are then added, and the mixture is stirred in vacuo until it is homogeneous. Finally, 0.1 part by weight of dibutyl-tin dilaurate is added, either directly or dissolved in a solvent, and is stirred into the mixture for approx. 10 minutes in vacuo until the mixture is homogeneous. The composition is then introduced into cartridges or tubes, and can be stored, without admission of moisture, for at least ½ year without the vulcanizability or the adhesion being adversely affected during later use.

The result of the measure according to the invention was that this product represents a substantial improvement, particularly with respect to the odor and, associated therewith, the processability of the material (no annoyance from acetic acid or amine). After crosslinking to give the rubber, the latter has a 100% modulus of elasticity of 0.15 N/mm$^2$, a tensile strength of 1.15 N/mm$^2$ and an elongation at break of 600% (all values measured according to DIN 53,504).

EXAMPLE 2

A mixture of 66 parts by weight of α,ω-dihydroxypolydimethylsiloxane having a viscosity of 18,000 mPa.s and 23.8 parts by weight of α,ω-bis-trimethylsiloxy-polydimethylsiloxane is initially introduced. 6 parts by weight of methylethoxy-di-isopropenoxysilane and 0.1 part by weight of 1,8-diaza-bicyclo(5,4,0)undec-7-ene are added at room temperature, and the mixture is stirred for a short time. 10 parts by weight of finely dispersed silicic acid are then added, and the mixture is stirred until it is homogeneous. Finally, 0.2 part by weight of dibutyl-tin dilaurate is added, either directly or dissolved in a solvent (toluene), and is stirred into the mixture for approx. 10 minutes in vacuo until the mixture is homogeneous. The composition is then introduced into cartridges or tubes and can be stored, without admission of moisture, for several months (with appropriately dry silicic acid, well over ½ year) without the vulcanizability or the transparency being adversely affected. In addition, the product does not show any yellowing.

The product, which is transparent, hardens through rapidly, well and uniformly in air, and, in accordance with the invention, does not release any gases having any kind of strong odor. The rubber formed therefrom exhibits a Shore A hardness of 10, an elongation at break of 550% and a 100% modulus of elasticity of 0.2 N/mm$^2$ and a tensile strength of 0.7 N/mm$^2$.

EXAMPLE 3

A mixture of 90 parts by weight of α,ω-dihydroxypolydimethylsiloxane having a viscosity of 50,000 mPa.s, 6 parts by weight of diethoxy-ethoxycarbonylpropen-2-yloxy-methylsilane and 0.1 part by weight of 1,8-diaza-bicyclo(5,4,0)-undec-7-ene is initially introduced. 6.7 parts by weight of finely dispersed silicic acid are added, and the mixture is stirred until it is homogeneous. Finally, 0.2 part by weight of dibutyl-tin dilaurate is added, either directly or dissolved in a solvent (xylene), and is stirred into the mixture for approx. 10 minutes in vacuo until the mixture is homogeneous. The composition is then introduced into cartridges or tubes and can be stored, without admission of moisture, for several months without the vulcanizability or the adhesion being adversely affected during later use. The product shows favorable properties similar to those of the products prepared in Example 1 to 2.

EXAMPLE 4

80 mg solid KOH are solved under stirring in 1 kg of diethoxy-ethoxycarbonylpropen-2-yloxy-methylsilane. 6 parts by weight of this mixture is stirred into 90 parts by weight of α,ω-dihydroxypolydimethylsiloxane until the mixture is homogeneous. Subsequently, 5 parts by weight silicic acid is added and the mixture is made homogeneous. Finally, 0.1 parts by weight dibutyl-tin dilaurate is added and the whole mixture is degased under vacuo. The resulting mixture may be brought into cartridges and then it can be stored (under exclusion of moisture) for many months.

It will be appreciated that the instant specification and examples are set forth by way of illustration and not limitation, and that various modifications and changes may be made without departing from the spirit and scope of the present invention.

We claim:

1. In a plastic organosiloxane molding composition which in the absence of water is capable of being stored and in the presence of moisture is cross-linked to a rubber, the composition comprising a hydroxypolydiorganosiloxane, a base and heavy metal compound as cross-linking catalyst, and a cross-linking agent, the improvement which comprises employing as the cross-linking agent a silane compound of the formula

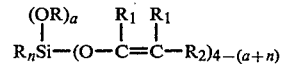

$$R_nSi-(O-C=C-R_2)_{4-(a+n)}$$
with substituents $(OR)_a$, $R_1$, $R_1$ or a partial hydrolysis product thereof, wherein
R is an optionally substituted alkyl, alkenyl or aryl group,
$R_1$ is hydrogen or R,
$R_2$ is an acyl, carbalkoxy or carbaroxy group or $R_1$,
a is 1–3,
n is 0, 1 or 2, and
$a+n \leq 3$.

2. A composition according to claim 1, wherein
R is methyl or ethyl,
$R_1$ is hydrogen or methyl, and
$R_2$ is hydrogen, methyl or carbalkoxy.

3. In the preparation of a rubber by exposing to moisture a plastic organosiloxane composition, the improvement which comprises employing as said composition a composition according to claim 1.

* * * * *